United States Patent [19]

Sakakibara et al.

[11] 3,741,332
[45] June 26, 1973

[54] SAFETY DEVICE FOR MOTOR-VEHICLE ENGINE-SPEED GOVERNOR

[75] Inventors: Naoji Sakakibara; Yasuhiro Kawabata; Korehiko Tsukuba, all of Kariya, Japan

[73] Assignee: Aisin Seiki Kabushiki Kaisha, Kariya-shi, Aichi-Ken, Japan

[22] Filed: Dec. 22, 1970

[21] Appl. No.: 100,626

[52] U.S. Cl.............. 180/108, 180/110, 123/103 A, 123/198 D, 123/198 DB
[51] Int. Cl............................................ B60k 31/00
[58] Field of Search............... 108/108, 107, 106, 108/105, 110; 123/103 A, 103 R, 198 D, 198 DB

[56] References Cited
UNITED STATES PATENTS

| | | | |
|---|---|---|---|
| 3,324,978 | 6/1967 | Mueller et al. | 180/108 X |
| 3,431,997 | 3/1969 | Kauthekar et al. | 180/108 |
| 3,343,423 | 9/1967 | Thorner | 180/108 X |
| 2,708,979 | 5/1955 | Reynoldson | 123/103 A X |
| 2,964,028 | 12/1960 | Wiles | 123/198 DB X |
| 3,563,332 | 2/1971 | Sturdy | 180/108 |

*Primary Examiner*—Leo Friaglia
*Assistant Examiner*—John P. Silverstrim
*Attorney*—Holman & Stern

[57] ABSTRACT

A safety device for a motor-vehicle engine-speed governor in which a safety-valve means is built additionally in the control valve means of the engine-speed governor. This safety valve means is opened when the motor-vehicle speed increases beyond the range of normal cruising speed defined by the engine speed governor by admitting atmospheric air into a vacuum chamber operatively connected to an engine throttle member and hence closing the same to reduce the vehicle speed. Alternatively, the safety valve means may be replaced by normally open switch means which, when closed in the event of excessive speed, opens the electromagnetic valve means of the engine speed governor adapted to provide communication between the vacuum chamber and the atmosphere upon depression of a brake pedal.

4 Claims, 4 Drawing Figures

3,741,332

3,741,332

SAFETY DEVICE FOR MOTOR-VEHICLE ENGINE-SPEED GOVERNOR

BACKGROUND OF THE INVENTION

This invention relates to a novel safety device for a motor-vehicle engine-speed governor designed to cause the motor vehicle travel at a constant cruising speed through automatic adjustment of the position of an engine throttle member by controlled difference between the pressures of a bisected vacuum chamber.

In spite of the immense benefit afforded by the engine-speed governor, in that the motor vehicle driver need not step on the accelerator pedal while driving the vehicle at cruising speed, a problem still remaining unsolved is that the vehicle speed may rise inordinately because of some such trouble in the engine speed governor such as the clogging of its valves or air inlet opening and mal-functioning of its working parts. The present invention contemplates the provision of a safety device designed to forestall the dangerous outcome potentially presented by the prior art engine speed governor which can permit a vehicle to run up to indefinitely high speeds.

SUMMARY OF THE INVENTION

It is a primary object of the present invention to provide a novel safety device for a motor-vehicle engine-speed governor in order to prevent the overspeed cruising of the motor vehicle.

Another object of the invention is to provide a simple and inexpensive safety device for a motor-vehicle engine-speed governor such that it can be readily built in the engine-speed governor.

Still another object of the invention is to provide a safety device for a motor-vehicle engine-speed governor in which safety-valve means capable of providing communication between the atmosphere and a vacuum chamber operatively connected to an engine throttle member is provided in addition to the control-valve means of the engine-speed with the safety-valve means being opened when the motor vehicle gathers speed beyond the normal range of cruising speed, thereby closing the engine throttle member to reduce the vehicle speed.

A further object of the invention is to provide a safety device for a motor-vehicle engine-speed governor in which normally open switch means is provided for electromagnetic valve means of the engine-speed governor adapted to provide communication between the vacuum chamber and the atmosphere upon depression of a brake pedal, with the normally open switch means being closed to open the electromagnetic valve means when the motor vehicle gathers speed beyond the normal range of cruising speed.

With these objects in view and the other objects hereinafter set forth, the present invention will now be described in more specific aspects thereof according to some preferred embodiments illustrated by way of example in the accompanying drawings, throughout which like reference numerals indicate like parts.

DETAILED DESCRIPTION OF THE INVENTION

Figure 1:
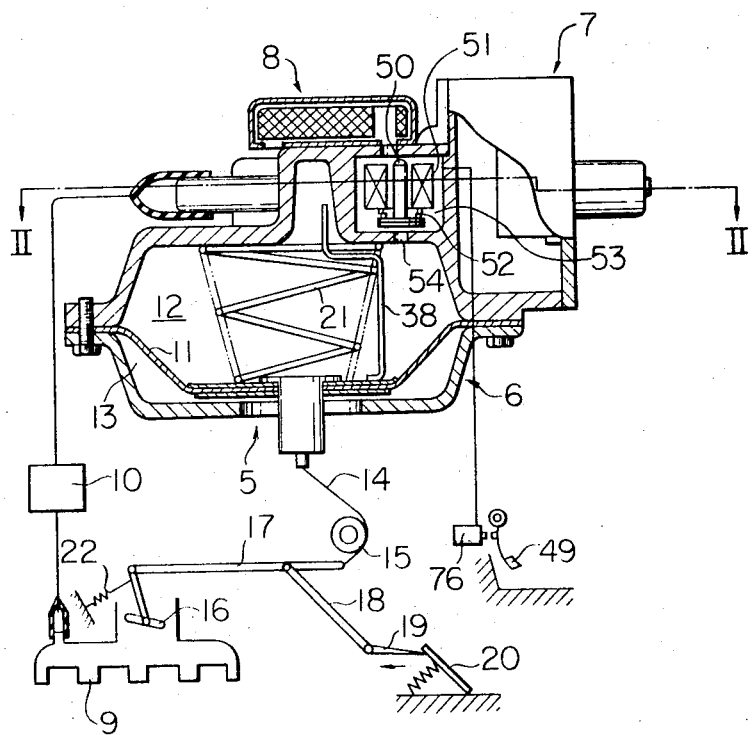
FIG. 1 is a schematic side view, with a part broken away, showing a motor vehicle engine speed governor in which is incorporated a safety device of the present invention.

Referring to the drawings and to FIG. 1 in particular, reference numeral 5 generally designates an engine speed governor body proper, comprising essentially a vacuum chamber 6, vehicle speed detecting means 7 and control valve means 8 for the control of the degree of vacuum of the vacuum chamber 6. The vacuum chamber 6 is in communication with an air intake manifold 9 of the motor vehicle via a solenoid valve 10 and is itself bisected into an upper chamber 12 and a lower chamber 13 by flexible diaphragm 11. This diaphragm 11 has a wire 14 connected to a rod 17 via a pulley 15, with the rod 17 being operatively coupled to an engine throttle member 16. The diaphragm 11 is energized downwardly in the drawing (i.e., in the direction to loosen the wire 14) by means of a compression spring 21, while the engine throttle member 16, which is capable of moving from its closed to fully open position for proportionately varying the vehicle speed, is kept energized to its closed position by means of a tension spring 22. An accelerator pedal 20 is linked via rods 18 and 19 to the engine throttle member for control thereof.

Figure 2:
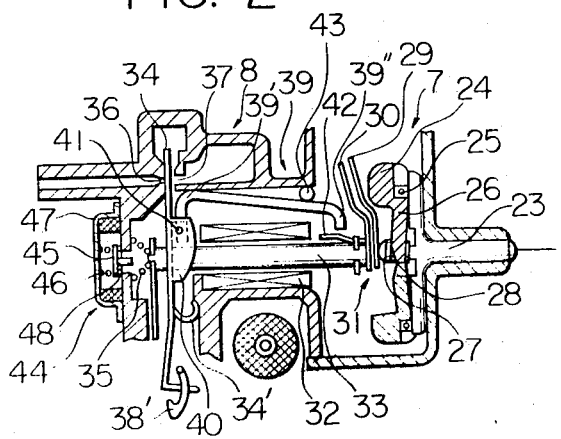
FIG. 2 is a sectional view of the motor vehicle engine-speed governor of FIG. 1 taken along the line II — II of FIG. 1, the view looking in the direction of the arrows.

With reference now to FIG. 2, the vehicle speed detecting means 7 includes a shaft 23 pivotally installed therein, a plurality of governor weights 24 pivoted on the shaft 23 by respective pins 25. This shaft 23 is coupled a suitable drive coupling means or a motor vehicle wheel (not shown) for the detection of the vehicle speed. Each of the governor weights 24 includes an arm 26 extending toward the center of the rotation of the shaft 23, and the distal end of this arm 26 is received in an annular groove 28 of a coupling 27 made of electrically insulating material. When the shaft 23 is rotating, the governor weights 24 are forced out, pivoting on their pins 25 to a degree determined by the centrifugal force due to the rotation of the shaft 23, whereby the arms 26 move the coupling 27 correspondingly in the axial direction.

Stationarily, however, a certain intervening space is provided between the coupling 27 and a speeder rod 33 still to be described, with a lower-limit switch 31 being interposed therebetween. This lower limit switch 31 has two leaf springs 29 and 30 which are respectively self-energized in opposite directions while keeping the coupling 27 and the speeder rod 33 in rotatable contact therewith. Accordingly, these leaf springs 29 and 30 serve as a contact pair of the lower-limit switch 31 in such a manner that the switch is closed at high vehicle speed and opens when the vehicle speed drops, for example, to 40 km/hr or less.

Further with reference to FIG. 2, the control valve means 8 include a fixed coil 32 in which is movably installed the speeder rod 33 as its core. The left-hand end (in the drawing) of this speeder rod 33 passes through a center opening of a flap valve 34 and abuts on a compression spring 35 held against the wall of the control valve housing. Near the left-hand end (in the drawing) of the coil 32, a center support 34' of the flap valve 34 is secured against the inner wall of the control valve housing. The upper end (in the drawing) of the flap valve 34 is disposed between a vacuum nozzle 36 and an atmospheric air nozzle 37, while the lower end thereof is in engagement with a cam portion 38' at the leading end of a lever 38 (FIG. 1) adapted to transmit the vertical motion of the diaphragm 11. A bracket 39 is provided above the coil 32, and a left hand side hooked end 39' (in FIG. 2) of this bracket 39 is swingably held by a flange 40 and a pin 41 of the flap valve 34 while a right-hand hooked end 39'' of the bracket 39 is pressed, as long as the speeder rod 33 is deenergized, against an adjustable stop 43 by means of a leaf spring 42 attached to the speeder rod 33.

On the left-hand side wall in FIG. 2 of the control valve housing, there is provided safety valve means in accordance with the present invention for the control of communication between the atmosphere and the upper chamber 12 of the vacuum chamber 6 (FIG. 1). Normally this communication is broken by means of a valve 45 included in the safety valve means 44 and energized in the communication breaking direction by means of a compression spring 46, until the speeder rod 33 moves in the left hand direction (in the drawing) against the compression springs 35 and 46 due to the overspeed cruising of the motor vehicle. This safety valve means 44 also includes an air filter 47 for preventing the entrance of dust particles and other foreign matter in the atmospheric air when the valve 45 opens to permit communication between the atmosphere and the upper chamber 12 of the vacuum chamber 6 (FIG. 1). Further, a seal 48 is attached to the contacting surface of the valve 45 for the complete closure of the passageway.

Referring to FIG. 1, there is provided valve means 50 above the vacuum chamber 6, with the valve means 50 being capable of directly providing communication between the vacuum chamber 6 and the atmosphere upon depression of a brake pedal 49. Essentially, this valve means 50 is of an electromagnetically operated plunger type, comprising a coil 51, a plunger 52 and a normally closed plunger switch 53, and keeping a vacuum chamber opening 54 normally closed from the atmosphere.

Figure 3:
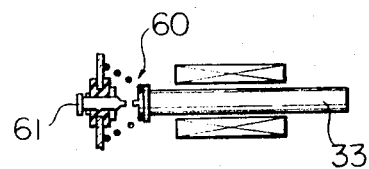
FIG. 3 is a schematic sectional view of normally open switch means for operating the electromagnetic valve means of FIG. 1 in accordance with the present invention.

Instead of the safety valve means 44 constituting the safety device of the present invention, there may be provided a switch 60 such as, for example, the one illustrated schematically in FIG. 3, on the left-hand side wall of the control valve housing in FIG. 2, thereby to control the electromagnetic valve means 50. In this manner, upon closure of this normally open switch 60 by the movement of the speeder rod 33 caused by the overspeed cruising of the motor vehicle, the plunger switch 53 can be opened to place the upper chamber 12 of the vacuum chamber 6 in communication with the atmosphere.

Figure 4:
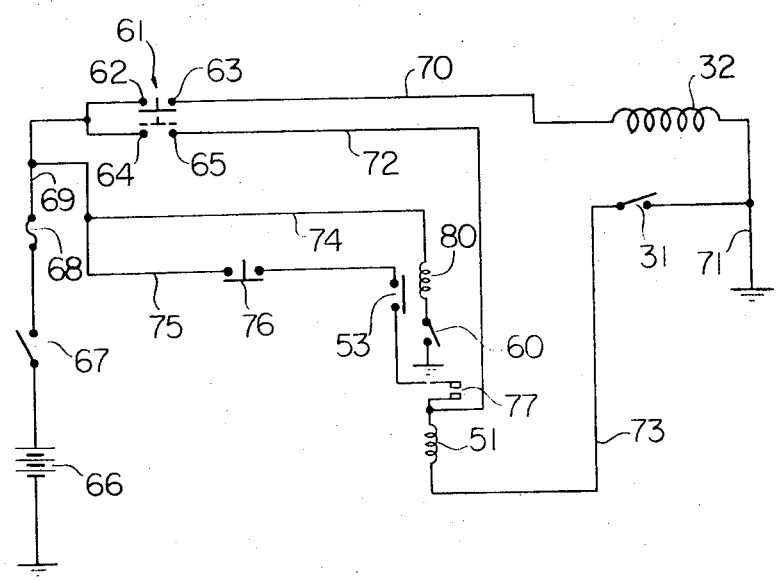
FIG. 4 is a circuit diagram showing the electrical system of the motor-vehicle engine-speed governor incorporating the normally open switch means of FIG. 3.

FIG. 4 illustrates an electric circuit including the normally open switch 60 for operating the plunger switch 53 of the electromagnetic valve means 50 in accordance with the present invention. In this circuit, a control switch 61 is capable of closing either an upper pair of contacts 62 and 63 or a lower pair of contacts 64 and 65, with the upper contact pair being normally kept closed thereby. With this upper contact pair closed, a circuit is completed which comprises a power supply 66, an ignition switch 67, a fuse 68, a conductor 69, the contacts 62 and 63, another conductor 70, the coil 32, and still another conductor 71, so that the speeder rod 33 (FIG. 2) is energized. Upon closure of the other pair of contacts 64 and 65, on the other hand, a self-holding circuit is completed which comprises the power supply 66, the ignition switch 67, the fuse 68, the conductor 69, the contacts 64 and 65, another conductor 72, the plunger energizing coil 51, still another conductor 73, the lower limit switch 31, and the conductor 71. A conductor 74 is provided for forming a circuit incorporating a coil 80 (for operating the plunger switch 53) and the normally open switch 60 (FIG. 3). One end of this circuit is connected to the positive side of the power supply 66, and the other end is grounded. A conductor 75 is provided for forming a circuit incorporating a normally closed brake switch 76, the normally closed plunger switch 53, and a contact pair 77 to be closed upon energization of the coil 51. One end of this latter circuit is connected to the positive side of the power supply 66 and the other end to the plunger energizing coil 51.

Proceeding now to a description of the mode of operation of the safety device of the present invention with relation to that of the engine speed governor illustrated in FIGS. 1 and 2, the control switch 61 (FIG. 4) is depressed when the motor vehicle attains a desired speed, with the result that the coil 32 of the control valve means 8 (FIG. 2) is de-energized. Thereupon, the bracket 39 becomes movable from the speeder rod 33, and, because of the action of the lever 38 in engagement with the diaphragm 11 (FIG. 1), the flap valve 34 is displaced by the cam portion 38' thereof to a suitable position between the vacuum nozzle 36 and the atmospheric air nozzle 37. Upon closure of the contacts 64 and 65 due to the above depression of the control switch 61, the aforementioned self-holding circuit is completed so that the coil 51 is energized to close the contact pair 77, thereby completing the circuit including the brake switch 76.

When the control switch 61 is released, the contacts 62 and 63 are reclosed so that the coil 32 of the control valve means 8 is re-energized to secure the flap valve 34 to the speeder rod 33 via the bracket 39. Hence the flap valve 34 will now follow the motion of this rod 33. As long as the vehicle speed is maintained above a predetermined lower limit, the lower limit switch 31 is closed, with the coupling 27 pressed against the speeder rod 33 through the leaf springs 29 and 30 constituting the lower limit switch 31.

When the vehicle speed varies so that the arm 26 of the governor weights 24 are flung out or closed proportionately with the vehicle speed, thereby moving the speeder rod 33 in its axial direction, the flap valve 34 moves correspondingly toward the vacuum nozzle 36 or toward the atmospheric air nozzle 37 in order to prevent the further variation of the vehicle speed. This motion of the flap valve 34 serves to vary the degree of vacuum of the upper portion 12 of the vacuum chamber 6 and hence to vary the throttle opening of the vehicle engine (not shown). The motor vehicle is thus kept at substantially constant cruising speed by the engine speed governor.

In the event, however, that this governor fails to perform its normal function due to nozzle clogging or some other trouble so that the vehicle speed rises in excess of a certain predetermined value, the speeder rod 33 is caused to move in the left-hand direction (in FIG. 2) against the forces of compression springs 35 and 46 in order to open the valve 45 of the safety valve means 44. The atmospheric air is then admitted into the upper chamber 12 of the vacuum chamber 6 with the result that the throttle member 16 moves to its closed position because of the forces of the compression spring 21 and the tension spring 22. The vehicle speed is reduced accordingly.

In the operation of the second example of the safety device of the invention, the coil 80 shown in FIG. 4 is energized upon closure of the normally open switch 60 by the left-ward movement of the speeder rod 33 in FIG. 2. This energization of the coil 80 opens the plunger switch 53, and the coil 51 is de-energized while the plunger 52 is displaced to place the upper chamber 12 of the vacuum chamber 6 in communication with the atmosphere through the vacuum chamber opening 54. The resultant flow of the atmospheric air into the upper chamber 12 of the vacuum chamber 6 reduces the vehicle speed through the same procedure as that described previously.

We claim:

1. In a motor-vehicle engine-speed governor for automatically controlling the cruising speed of the motor vehicle through adjustment of the position of a throttle member of the motor-vehicle engine, comprising a vacuum chamber for adjusting the position of said throttle member, control valve means for the control of the degree of vacuum of said vacuum chamber, and motor vehicle speed detecting means including a moving member responsive to change in the speed of the motor vehicle and operating said control valve means in accordance with the change in the motor vehicle speed, a safety device comprising safety valve means for placing said vacuum chamber in communication with the atmosphere, said safety valve means including a valve, spring means urging said valve to the closed direction and which places the vacuum chamber in communication with the atmosphere, said valve being opened by said moving member of said vehicle speed detecting means when the vehicle speed exceeds the maximum point of the cruising speed controlled by said engine-speed governor, said maximum point being lower than the maximum speed of the vehicle itself, whereupon the atmospheric air is admitted through said safety valve means into said vacuum chamber thereby to cause said engine throttle member to move to its closed position and thereby to reduce the vehicle speed.

2. The safety device for the motor-vehicle engine-speed governor as claimed in claim 1, in which an air filter is installed in said safety valve means in order to prevent the entrance of foreign matter when said normally closed valve of said safety valve means is opened to admit the atmospheric air into said vacuum chamber.

3. In a motor-vehicle engine-speed governor for automatically controlling the cruising speed of the motor vehicle through adjustment of the position of a throttle member of the motor-vehicle engine, comprising a vacuum chamber for adjusting the position of said throttle member, control valve means for the control of the degree of vacuum of said vacuum chamber, motor-vehicle speed detecting means including a moving member responsive to change in the speed of the motor-vehicle and operating said control valve means in accordance with the change in the vehicle speed, and electromagnetic valve means capable of providing communication between said vacuum chamber and the atmosphere upon depression of a brake pedal, said electromagnetic valve means including a plunger, a coil and a plunger switch, a safety device for said motor vehicle engine speed governor comprising normally open switch means to be closed by said moving member of said vehicle speed detecting means when the vehicle speed exceeds the maximum point of the cruising speed controlled by said engine speed governor, said maximum point being lower than the maximum speed of the vehicle itself, and means adapted to displace said plunger of said electromagnetic valve means upon closure of said normally-open switch means and thereby to place said vacuum chamber in communication with the atmosphere.

4. The safety device for a motor-vehicle engine-speed governor as claimed in claim 3, in which said means includes a coil to be energized upon closure of said normally-open switch means so that said plunger switch of said electromagnetic valve means is opened and said coil of said electromagnetic valve means is de-energized, thereby displacing said plunger and providing communication between said vacuum chamber and the atmosphere.

* * * * *